(12) United States Patent
Jiang

(10) Patent No.: US 10,866,350 B2
(45) Date of Patent: Dec. 15, 2020

(54) PHASE RETARDER AND OPTICAL COMB FILTER THEREOF

(71) Applicant: Huawei Technologies Co., Ltd., Shenzhen (CN)

(72) Inventor: Chendi Jiang, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 266 days.

(21) Appl. No.: 15/607,047

(22) Filed: May 26, 2017

(65) Prior Publication Data

US 2017/0261669 A1 Sep. 14, 2017

Related U.S. Application Data

(63) Continuation of application No. PCT/CN2014/092596, filed on Nov. 29, 2014.

(51) Int. Cl.
*G02B 5/30* (2006.01)
*H04J 14/02* (2006.01)
*G02B 27/28* (2006.01)

(52) U.S. Cl.
CPC .......... *G02B 5/3083* (2013.01); *G02B 27/28* (2013.01); *G02B 27/283* (2013.01); *H04J 14/02* (2013.01); *H04J 14/0208* (2013.01)

(58) Field of Classification Search
CPC .............. G02B 5/3083; G02B 27/283; G02B 6/29349; G02B 6/29395; G02B 6/29398; G02B 6/2713; G02B 6/29358; G02B 6/29394; G02B 6/2773; G02B 6/12007; G02B 6/29302; G02B 6/29347; G02B 6/29352; G02B 6/29386; G02B 6/272; G02B 6/2766; G02B 6/4215;
(Continued)

(56) References Cited

U.S. PATENT DOCUMENTS 6,304,689 B1 10/2001 Dingel et al.
6,867,868 B1 * 3/2005 Barbarossa .............. G02B 1/06
356/519
(Continued)

FOREIGN PATENT DOCUMENTS

CN 1407750 A 4/2003
CN 201340488 Y 11/2009
(Continued)

*Primary Examiner* — Mouloucoulaye Inoussa
(74) *Attorney, Agent, or Firm* — Leydig, Voit & Mayer, Ltd.

(57) ABSTRACT

A phase retarder and an optical comb filter are disclosed. The phase retarder includes a polarization beam splitter, a first air arm, and a second air arm, where the polarization beam splitter is configured to decompose a beam into a first light component propagated in a first direction and a second light component propagated in a second direction, the first direction is perpendicular to the second direction; the first air arm is disposed on a second side wall of the polarization beam splitter, and is configured to receive the first light component and reflect it back; and the second air arm is disposed on a third side wall of the polarization beam splitter, and is configured to receive the second light component and reflect it back. Two light components interfere, and the interference light is emitted from a fourth side wall of the polarization beam splitter.

11 Claims, 8 Drawing Sheets

(58) Field of Classification Search
CPC .......................... G02B 6/4246; H04J 14/0208;
H04J 14/0282; H04B 10/677; H04B
10/2507; H04B 10/675; H04B 10/615;
H04B 10/40; H04L 27/223; G02F 1/0147
USPC ...... 356/450, 491, 521; 398/208, 9, 202, 65,
398/212; 359/325, 278, 238, 577, 288;
385/11, 24
See application file for complete search history.

(56) References Cited

U.S. PATENT DOCUMENTS

| | | | | |
|---|---|---|---|---|
| 2002/0089745 | A1* | 7/2002 | Huang | G02B 27/283 |
| | | | | 359/484.03 |
| 2002/0171908 | A1* | 11/2002 | Copner | G02B 6/29358 |
| | | | | 359/278 |
| 2012/0237157 | A1 | 9/2012 | Zhang et al. | |

FOREIGN PATENT DOCUMENTS

| | | |
|---|---|---|
| CN | 101943772 A | 1/2011 |
| CN | 102681096 A | 9/2012 |
| CN | 203705684 U | 7/2014 |
| CN | 203732757 U | 7/2014 |
| CN | 203732814 U | 7/2014 |
| CN | 104166243 A | 11/2014 |

\* cited by examiner

PHASE RETARDER AND OPTICAL COMB FILTER THEREOF

CROSS-REFERENCE TO RELATED APPLICATIONS

This application is a continuation of International Application No. PCT/CN 2014/092596, filed on Nov. 29, 2014, the disclosure of which is hereby incorporated by reference in its entirety.

TECHNICAL FIELD

The present invention relates to the field of optical communications, and in particular, to a phase retarder and an optical comb filter thereof.

BACKGROUND

In an era in which bandwidths are resources, to make full use of limited bandwidth resources, small channel intervals have become a developing trend. To meet rapidly increasing bandwidth requirements and more effectively use a gain bandwidth of an erbium-doped optical fiber amplifier (EDFA) that is technically mature at present, a dense wavelength division multiplexing system needs to provide more multiplexing channels. Therefore, a channel interval becomes narrower. A dense wavelength division multiplexing system with 40 channels at intervals of 100 GHz has been widely used commercially. To further improve bandwidth utilization, a channel interval is developed from 100 GHz to 50 GHz or narrower. However, a narrower channel interval indicates a higher requirement on a multiplexer/demultiplexer of the dense wavelength division multiplexing system and greater difficulty in a conventional manufacturing process. A 100-GHz filter and a narrower-band pass filter that are used as demultiplexers have a low yield rate, leading to an extremely high price of a narrow-band pass filter.

The application of a wavelength interleaving multiplexing technology (Interleaving) greatly reduces costs of the dense wavelength division multiplexing system and mitigates pressure of the dense wavelength division multiplexing system on a filter device. In this technology, a column of signal light with a frequency interval of f are divided into two columns of signal light with a frequency interval of 2f, and the signal light from two channels is separately output, where one channel is an odd channel, and the other channel is an even channel. Generally, a device manufactured by using the interleaving technology is also referred to as an interleaver or an optical comb filter.

Currently, there are several design solutions of optical comb filters. However, these optical comb filters generally have the following disadvantages: an isolation degree is low, a manufacturing process is difficult, a channel interval cannot be dynamically adjustable, upgrade is difficult, and it is hard to control a temperature drift effect, and cannot meet use requirements.

SUMMARY

In view of this, an objective of the present invention is to provide an optical comb filter with a dynamically adjustable channel interval. Dynamical adjustment of a channel interval is implemented by designing a phase retarder with an adjustable optical path.

In a first aspect, a first phase retarder is provided, including a polarization beam splitter, a first air arm, and a second air arm, where the polarization beam splitter is configured to decompose a beam incident on a first side wall of the polarization beam splitter into a first light component propagated in a first direction and a second light component propagated in a second direction, where the first direction is perpendicular to the second direction, and a polarization state of the first light component is perpendicular to a polarization state of the second light component;

the first air arm is disposed on a second side wall of the polarization beam splitter, and is configured to receive the first light component and reflect the first light component back to the polarization beam splitter; and the second air arm is disposed on a third side wall of the polarization beam splitter, and is configured to receive the second light component and reflect the second light component back to the polarization beam splitter, so that interference light is formed after the second light component interferes with the first light component, and the interference light is emitted from a fourth side wall of the polarization beam splitter, where a first optical path of the first air arm is not equal to a second optical path of the second air arm, the first side wall and the third side wall are disposed opposite to each other, and the second side wall and the fourth side wall are disposed opposite to each other.

In a second aspect, an optical comb filter is provided, including a first optical splitting component, a first phase retarder, and a second optical splitting component, where the first optical splitting component is configured to emit a group of beams to the first phase retarder;

the first phase retarder includes a polarization beam splitter, a first air arm, and a second air arm, where the first polarization beam splitter is configured to decompose the group of beams incident on a first side wall of the first polarization beam splitter into a first light component propagated in a first direction and a second light component propagated in a second direction, where the first direction is perpendicular to the second direction, and a polarization state of the first light component is perpendicular to a polarization state of the second light component;

the first air arm is disposed on a second side wall of the first polarization beam splitter, and is configured to receive the first light component and reflect the first light component back to the first polarization beam splitter; and the second air arm is disposed on a third side wall of the first polarization beam splitter, and is configured to receive the second light component and reflect the second light component back to the first polarization beam splitter, so that interference light is formed after the second light component interferes with the first light component, and the interference light is emitted from a fourth side wall of the first polarization beam splitter, where a first optical path of the first air arm is not equal to a second optical path of the second air arm, the first side wall and the third side wall are disposed opposite to each other, and the second side wall and the fourth side wall are disposed opposite to each other; and the second optical splitting component is configured to reflect interference light output by the first phase retarder to the first phase retarder and the first optical splitting component, so as to enable the first optical splitting component to emit first output light and second output light.

In an optical comb filter of embodiments of the present invention, a first phase retarder with an adjustable optical path difference is designed, so as to implement adjustability of a channel interval, overcome a defect that it is hard to upgrade an optical comb filter of a birefringent crystal type, and implement comb filtering of channels at intervals of 100 GHz to 50 GHz to 25 GHz or comb filtering of denser channels. In addition, because the phase retarder uses a structural design of air arms, the phase retarder has an extremely small temperature drift effect, low insertion loss, a high isolation degree, and extremely low dispersion in a filtering channel range of a transmission spectrum, meeting a transmission application scenario of a dense wavelength division multiplexing system with a higher rate.

BRIEF DESCRIPTION OF DRAWINGS

To describe technical solutions in the present invention more clearly, the following briefly describes the accompanying drawings for describing implementation manners. The accompanying drawings in the following description show merely some implementation manners of the present invention, and a person of ordinary skill in the art may still derive other drawings from these accompanying drawings without creative efforts.

DESCRIPTION OF EMBODIMENTS

The following clearly describes technical solutions in embodiments of the present invention with reference to the accompanying drawings. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
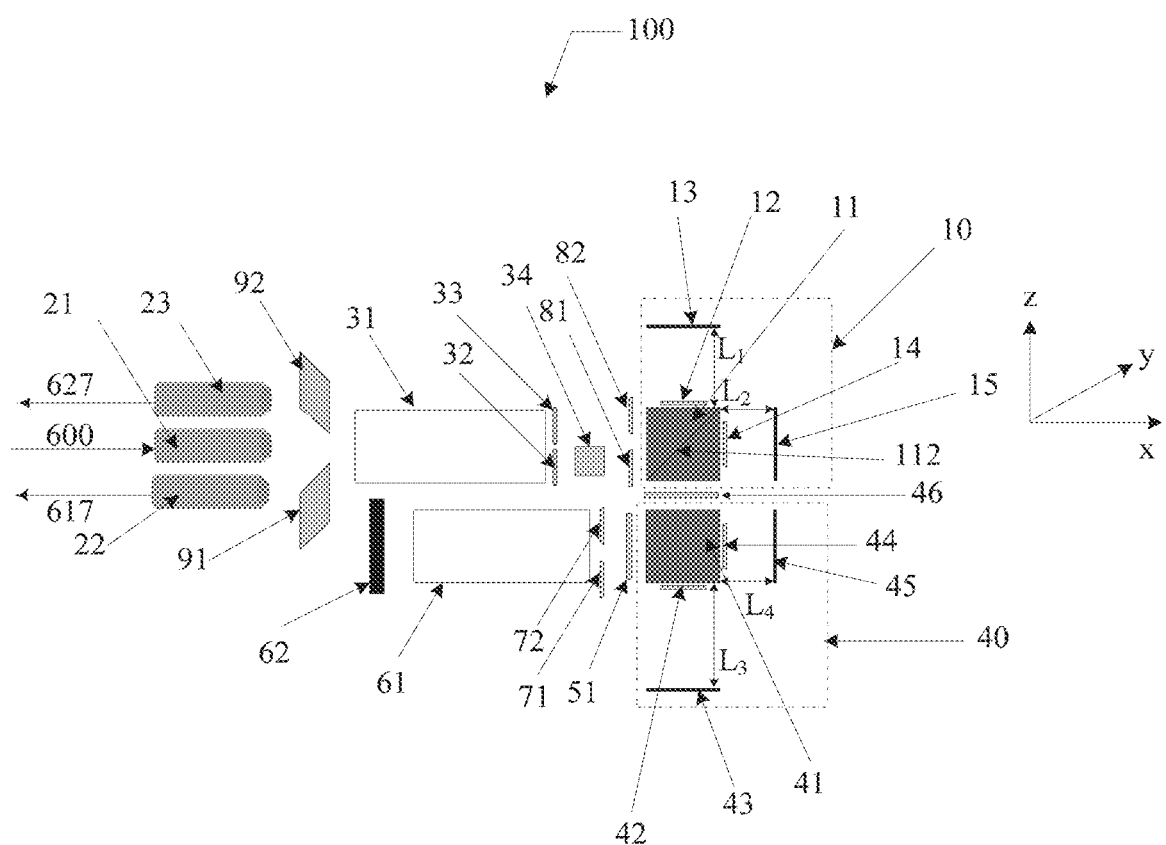
FIG. 1 is a schematic structural diagram of an optical comb filter according to an embodiment of the present invention.

Referring to FIG. 1, an embodiment of the present invention provides an optical comb filter 100, configured to decompose a column of signal light with a frequency interval of f into two columns of signal light with a frequency interval of 2f in an interleaving technology. The optical comb filter 100 includes a first optical splitting component, a first phase retarder 10, and a second optical splitting component, where the first optical splitting component receives signal light 600 propagated by an input collimator 21 and outputs two beams to the first phase retarder 10; after receiving the two beams, the first phase retarder 10 generates and outputs first interference light and second interference light; the second optical splitting component receives the first interference light and the second interference light, decomposes the first interference light and the second interference light, reflects the beams obtained through decomposition back to the first phase retarder 10, and propagates the beams to the first optical splitting component; the first optical splitting component receives the beams propagated by the first phase retarder 10, and generates first output light 617 emergent from a first output collimator 22 and second output light 627 emergent from a second output collimator 23, where the first output light 617 and the second output light 627 are spatially separated and have signal light with the frequency interval of 2f.

Figure 2:
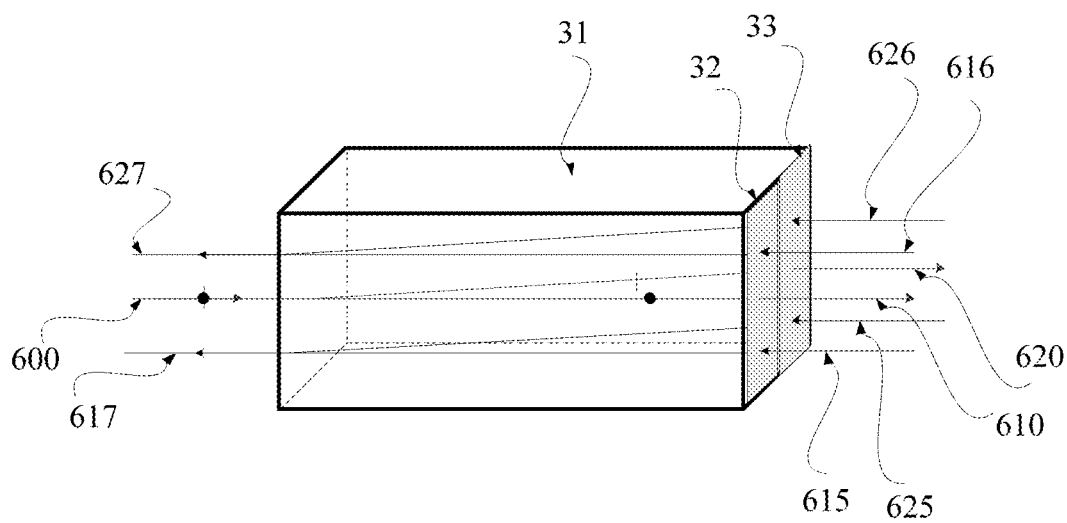
FIG. 2 is a schematic diagram of an optical path of a beam at a first birefringent crystal.

Referring to FIG. 2, FIG. 2 is a schematic diagram of an optical path of a beam at a first birefringent crystal. In this embodiment of the present invention, the input collimator 21 is configured to collimate the incident signal light 600 and then propagate the collimated signal light to the first optical splitting component. The first optical splitting component includes a first birefringent crystal 31, and the first birefringent crystal 31 may be a YVO4 crystal or another crystal with a birefringent effect. When the signal light 600 enters the first birefringent crystal 31 in an optical axis that is not parallel to the first birefringent crystal 31 (the light is not double-refracted when being propagated in a particular direction, and the direction is referred to as an optical axis of a crystal), because of the birefringent effect, when the signal light 600 is propagated in the first birefringent crystal 31, two linearly polarized light beams that are spatially separated are formed, that is, first sub-signal light 610 (which is physically o light, that is, ordinary light) and second sub-signal light 620 (which is physically e light, that is, an extraordinary light), where propagation of the o light is propagated complies with the refraction law, while the e light does not comply with the refraction law, that is, the e light and the o light do not overlap. Polarization directions of the o light and the e light are perpendicular to each other.

In this embodiment of the present invention, the first optical splitting component further includes a first half-wave plate 32 and a second half-wave plate 33. The first half-wave plate 32 and the second half-wave plate 33 are two half-wave plates with a same optical axis direction. The first half-wave plate 32 is configured to receive the first sub-signal light 610 and enable a polarization direction of the first sub-signal light 610 to rotate by a predetermined angle, and the second half-wave plate 33 is configured to receive the second sub-signal light 620 and enable a polarization direction of the second sub-signal light 620 to rotate by a predetermined angle, where the first sub-signal light 610 and the second sub-signal light 620 that are output by the first half-wave plate 32 and the second half-wave plate 33 form a group of beams and are propagated to the first phase retarder 10. The first half-wave plate 32 and the second half-wave plate 33 may be 22.5° or 67.5° half-wave plates, that is, an included angle between a vibration plane of the first sub-signal light 610 upon incidence and a crystal principal cross-section of the first half-wave plate 32 is 22.5° or 67.5°, and an included angle between a vibration plane of the second sub-signal light 620 upon incidence and a crystal principal cross-section of the second half-wave plate 33 is 22.5° or 67.5°. In this case, polarization directions of the first sub-signal light 610 and the second sub-signal light 620 are rotated by 45° after the first sub-signal light 610 and the second sub-signal light 620 pass through the first half-wave plate 32 and the second half-wave plate 33, so that the first sub-signal light 610 and the second sub-signal light 620 become two beams with parallel polarization directions, and the polarization directions are both 45°.

It should be noted that because the polarization directions of the first sub-signal light 610 and the second sub-signal light 620 are originally perpendicular, in order to enable the polarization direction of the first sub-signal light 610 to be parallel to the polarization direction of the second sub-signal light 620, the first half-wave plate 32 and the second half-wave plate 33 should enable the polarization direction of the first sub-signal light 610 and the polarization direction of the second sub-signal light 620 to rotate in opposite directions. For example, if the first half-wave plate 32 enables the polarization direction of the first sub-signal light 610 to rotate clockwise by 45°, the second half-wave plate 33 should enable the polarization direction of the second sub-signal light 620 to rotate counterclockwise by 45° (or rotate clockwise by 135°), so as to ensure that after rotation, the polarization direction of the first sub-signal light 610 is parallel to the polarization direction of the second sub-signal light 620. That is, when the first half-wave plate 32 is a 22.5° half-wave plate, the second half-wave plate is a 67.5° half-wave plate, or when the first half-wave plate 32 is a 67.5° half-wave plate, the second half-wave plate is a 22.5° half-wave plate.

Figure 3:
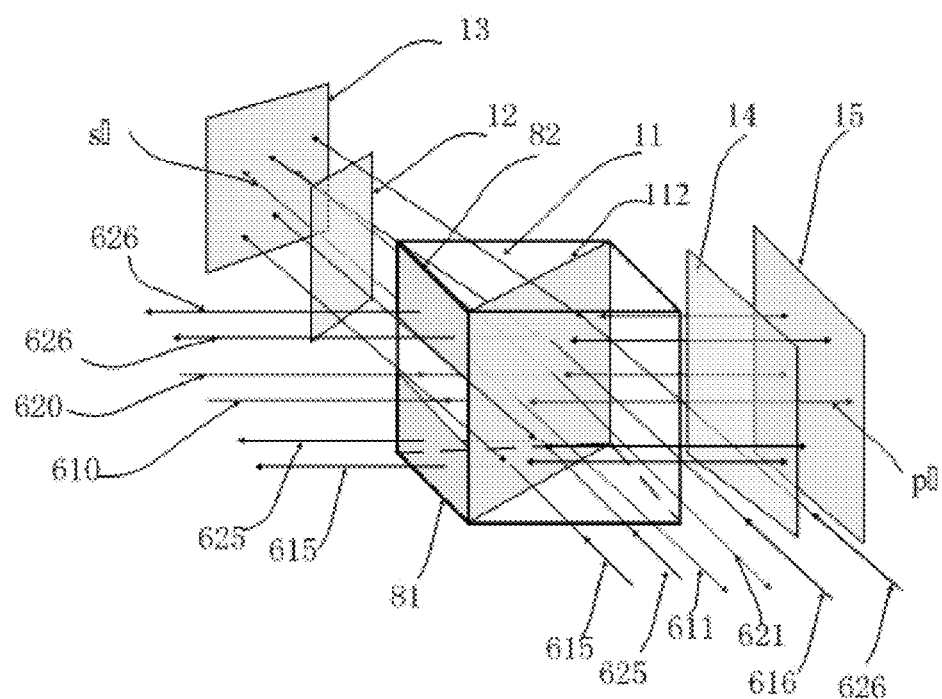
FIG. 3 is a schematic structural diagram of a first phase retarder according to a first embodiment of the present invention.

Referring to FIG. 1 and FIG. 3 together, FIG. 3 is a schematic structural diagram of a first phase retarder according to a first embodiment of the present invention. In this embodiment of the present invention, the first phase retarder 10 includes a first polarization beam splitter 11, a first air arm, and a second air arm, where the first polarization beam splitter 11 has a first optical splitting surface 112; the first air arm includes a first polarizer 12 and a first reflector 13, the first polarizer 12 is disposed between a second side wall of the first polarization beam splitter 11 and the first reflector 13, and an optical path between the second side wall of the first polarization beam splitter 11 and the first reflector 13 is a first optical path $L_1$; the second air arm includes a second polarizer 14 and a second reflector 15, the second polarizer 14 is disposed between a third side wall of the first polarization beam splitter 11 and the second reflector 15, and an optical path between the third side wall of the first polarization beam splitter 11 and the second reflector 43 is a second optical path $L_2$, where the second side wall is adjacent to the third side wall. The first optical path $L_1$ and the second optical path $L_2$ are not equal and have a first optical path difference $\Delta L_1$, that is, an absolute value of $(L_1-L_2)$ is $\Delta L_1$. The first polarizer 12 and the second polarizer 14 may be 45° ¼ wave plates. In this case, after passing through the first polarizer 12 or the second polarizer 14, linearly polarized light becomes circularly polarized light. After passing through the first polarizer 12 or the second polarizer 14 again, the circularly polarized light becomes linearly polarized light again, of which a polarization direction is rotated by 90° compared with the original linearly polarized light.

In this embodiment of the present invention, after being transmitted through the first half-wave plate 32, the first sub-signal light 610 is incident on the first side wall of the first polarization beam splitter 11 to enter the first phase retarder 10, and is decomposed at the first optical splitting surface 112 into a first sub-light component (that is, s light with a polarization direction parallel to an incident surface is going to be reflected at the first optical splitting surface 112) propagated in a first direction (that is, a z direction in FIG. 1, where propagation in a positive direction of z and propagation in a negative direction of z are both defined as propagation in the first direction herein) and a second-light component (that is, p light with a polarization direction perpendicular to an incident surface is going to be transmitted at the first optical splitting surface 112) propagated in a second direction (that is, an x direction in FIG. 1, where propagation in a positive direction of x and propagation in a negative direction of x are both defined as propagation in the second direction herein). The first sub-light component enters the first air arm and arrives at the first reflector 13 after being transmitted through the first polarizer 12. The first reflector 13 reflects the first sub-light component, so as to enable the first sub-light component to return to the first polarization beam splitter 11 after being transmitted through the first polarizer 12 again, and the first sub-light component is further propagated to the first optical splitting surface 112. Because the first sub-light component passes through the first polarizer 12 twice, a polarization direction of the first sub-light component is rotated by 90° (that is, the polarization direction is rotated from a direction parallel to the incident surface to a direction perpendicular to the incident surface). The second sub-light component is propagated to the second air arm after being transmitted through the first optical splitting surface 112, and arrives at the second reflector 15 after being transmitted through the second polarizer 14. The second reflector 15 reflects the second sub-light component, so as to enable the second sub-light component to return to the first polarization beam splitter 11 after being transmitted through the second polarizer 14 again, and the second sub-light component is further propagated to the first optical splitting surface 112. Because the second sub-light component passes through the second polarizer 14 twice, a polarization direction of the second sub-light component is rotated by 90° (that is, the polarization direction is rotated from a direction perpendicular to the incident surface to a direction parallel to the incident surface). In this case, after passing through the first optical splitting surface 112, the first sub-light component and the second sub-light component are both propagated in the first direction. Because the first optical path $L_1$ and the second optical path $L_2$ are not equal, the first sub-light component and the second sub-light component interfere with each other at the first optical splitting surface 112, and generate the first interference light 611.

It should be noted that in this embodiment of the present invention, when one beam, for example, the first sub-signal light 610 of this embodiment, enters the first phase retarder 10, the first phase retarder 10 may be configured to enable the incident first sub-signal light 610 to generate a predetermined phase delay, and configured to obtain desired interference light by setting the first optical path difference $\Delta L_1$. Because the first phase retarder 10 uses a design structure of air arms, the first optical path difference $\Delta L_1$ has temperature stability; that is, when a temperature changes significantly, the first optical path difference $\Delta L_1$ does not change greatly. The design structure of air arms further greatly facilitates adjustment of the first optical path difference $\Delta L_1$ (the adjustment of the first optical path difference $\Delta L_1$ can be implemented by only moving the first reflector 13 and the second reflector 15). In addition, the design structure of air arms also has advantages of low insertion loss and extremely low dispersion in a filtering channel range of a transmission spectrum, is convenient to be applied to various different optical devices, and has relatively high applicability.

In this embodiment of the present invention, an optical path propagation process of the second sub-signal light 620 in the first phase retarder 10 is substantially the same as an optical path propagation process of the first sub-signal light 610 in the first phase retarder 10. The second sub-signal light 620 is decomposed in the first phase retarder 10 into a third sub-light component propagated in the first direction and a fourth sub-light component propagated in the second direction. The third sub-light component and the fourth sub-light component interfere with each other at the first optical splitting surface 112 after passing through the first air arm and the second air arm, and generate second interference light 621 propagated in the first direction. For specific optical path analysis, refer to the foregoing description, and details are not described herein again.

In this embodiment of the present invention, when two beams, for example, the first sub-signal light 610 and the second sub-signal light 620 of this embodiment, enter the first phase retarder 10, the function of the first phase retarder 10 is to enable the incident first sub-signal light 610 and second sub-signal light 620 to obtain a desired interference period or a free spectral range (FSR), so that the first sub-signal light 610 and the second sub-signal light 620 have a predetermined frequency interval, where $FSR=c/(2n*\Delta L_1)$, c is a beam, and n is a refractive index of light in the air. Hence, it can be known that the desired interference period or FSR may be obtained by designing the first optical path difference $\Delta L_1$ between the first optical path $L_1$ and the second optical path $L_2$.

Figure 4:
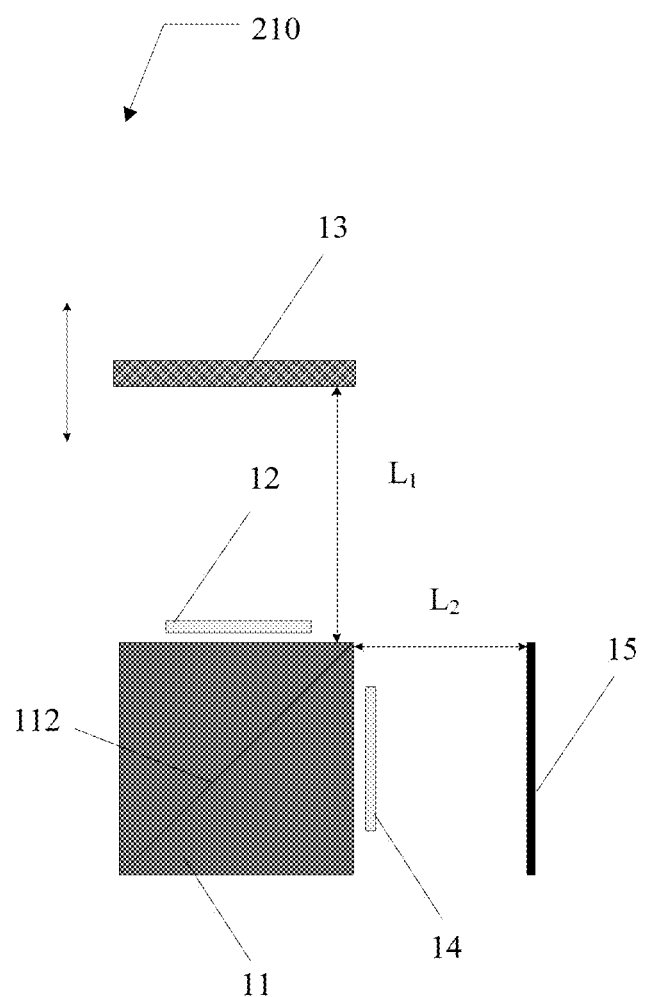
FIG. 4 is a schematic structural diagram of a first phase retarder according to a second embodiment of the present invention.

Referring to FIG. 4, FIG. 4 is a schematic structural diagram of a first phase retarder according to a second embodiment of the present invention. In this embodiment of the present invention, the first phase retarder 210 includes the first polarization beam splitter 11, the first polarizer 12, the first reflector 13, the second polarizer 14, and the second reflector 15 of the first embodiment. Moreover, connection and placement relationships of these elements are basically the same, and details are not described herein again. A difference is that in this embodiment of the present invention, the first reflector 13 and/or the second reflector 15 are adjustable micromirrors, and switching between different channel intervals or dynamic adjustment of a central wavelength may be implemented by adjusting the adjustable micromirrors. For example, the first optical path $L_1$ and/or the second optical path $L_2$ may be greatly adjusted by using the adjustable micromirrors, so as to obtain different first optical path differences $\Delta L_1$ and implement dynamic switching between different channel intervals. For example, the first optical path difference $\Delta L_1$ is greatly adjusted to implement dynamic switching among channel intervals of 100 GHz to 50 GHz to 52 GHz or 75 GHz, or the first optical path difference $\Delta L_1$ is slightly adjusted by using the adjustable micromirrors, to implement dynamic adjustment of the central wavelength. It should be noted that the adjustable micromirror may be implemented by using a micro-electromechanical system (MEMS) technology, for example, the adjustable micromirror is made into the form of an MEMS mirror, and by means of precise control over forward and backward movements of the MEMS mirror, dynamic adjustment of the first optical path difference $\Delta L_1$ of the first phase retarder 210 is implemented, so as to further implement the function of dynamically adjusting a channel interval. In addition, displacement adjustment of the adjustable micromirror may also be implemented by using the piezoelectric technology, for example, stretching of a piezoelectric crystal is controlled by means of power-on, so as to further dynamically adjust lengths of the two air arms. Such a dynamic adjustable structure avoids a manual adjustment process, is time-saving and labor-saving, and can be remotely controlled, and therefore can better meet development requirements of a future dynamic optical network. It may be understood that the foregoing adjustable micromirror also has other possible implementation technologies in addition to the MEMS technology and the piezoelectric technology. These implementation technologies are within the protection scope of this solution, and details are not described herein again.

Figure 5:
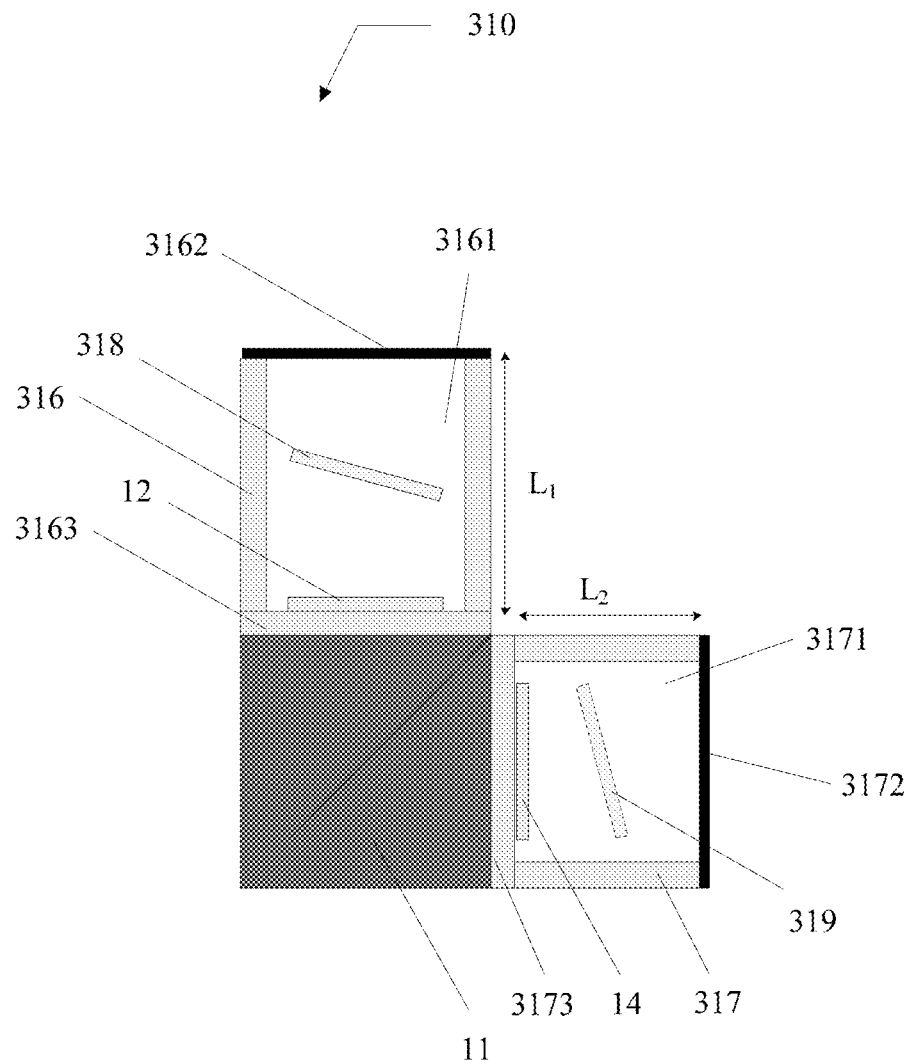
FIG. 5 is a schematic structural diagram of a first phase retarder according to a third embodiment of the present invention.

Referring to FIG. 5, FIG. 5 is a schematic structural diagram of a first phase retarder according to a third embodiment of the present invention. In this embodiment of the present invention, in addition to the first polarization beam splitter 11, the first polarizer 12, and the second polarizer 14 of the first embodiment, the first phase retarder 310 further includes a first etalon 316 and a second etalon 317, where the first etalon 316 has a first air cavity 3161 and a first reflective surface 3162, and the second etalon 317 has a second air cavity 3171 and a second reflective surface 3172. The first polarizer 12 is accommodated in the first air cavity 3161 and is located between the second side wall and the first reflective surface 3162. The second polarizer 14 is accommodated in the second air cavity 3171 and is located between the third side wall and the second reflective surface 3172. The first etalon 316 has a preset first optical path $L_1$, and the second etalon 317 has a preset second optical path $L_2$.

Figure 6:
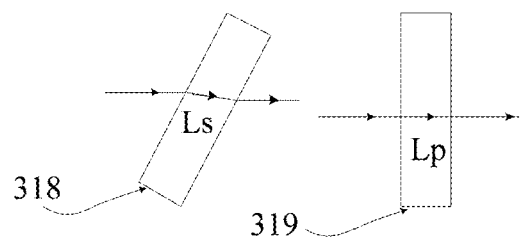
FIG. 6 is a schematic diagram of adjustment by a first light compensation plate and a second light compensation plate that are shown in FIG. 5.

Referring to FIG. 6, FIG. 6 is a schematic adjustment diagram of a first light compensation plate and a second light compensation plate that are shown in FIG. 5. In this embodiment of the present invention, the first air arm further includes a first light compensation plate 318, and the second air arm further includes a second light compensation plate 319. The first light compensation plate 318 is disposed in the first air cavity 3161 of the first etalon 316 and is located between a front wall 3163 of the first etalon 316 and the first reflective surface 3162. The second light compensation plate 319 is disposed in the second air cavity 3171 of the second etalon 317 and is located between a front wall 3173 of the second etalon 317 and the second reflective surface 3172. Because the first polarization beam splitter 11, and arm lengths and front wall thicknesses of the etalons may have errors in a manufacturing process, the thickness of the first polarization beam splitter 11, the thicknesses of the two air arms, and glass block thicknesses of the front walls are inconsistent, and therefore, the first optical path difference $\Delta L_1$ of the two air arms of the first phase retarder 310 is no longer determined by a theoretical length difference of the air arms. The thickness of the first polarization beam splitter 11 and the glass block thicknesses of the front walls may also have an effect on the first optical path difference $\Delta L_1$ of the first phase retarder 310. As a result, an actual FSR is deviated from a theoretical FSR, further causing a central wavelength of a transmission spectrum of the optical comb filter 100 to drift. The first light compensation plate 318 and the second light compensation plate 319 may be configured to compensate optical paths of the two air arms of the first phase retarder 310, so as to adjust the central wavelength of the transmission spectrum. Specifically, if the first optical path of the first air arm is less than a theoretically designed optical path, the first light compensation plate 318 is rotated. As shown in FIG. 6, due to inclined incidence, light is refracted in the first light compensation plate 318, and the second light compensation plate 319 of the second air arm keeps being placed perpendicular to the incident light. The first optical path difference $\Delta L_1$ between the two air arms is precisely adjusted by using a tiny dispersion of $L_s$ to $L_p$ (as shown in FIG. 6), so as to precisely adjust the central wavelength of the transmission spectrum. Similarly, if an optical path of the second air arm is less than the theoretically designed optical path, the first light compensation plate 318 of the first air arm is maintained to be perpendicular to the optical path, and the second light compensation plate 319 of the second air arm is rotated, so as to adjust the central wavelength of the transmission spectrum.

Figure 7:
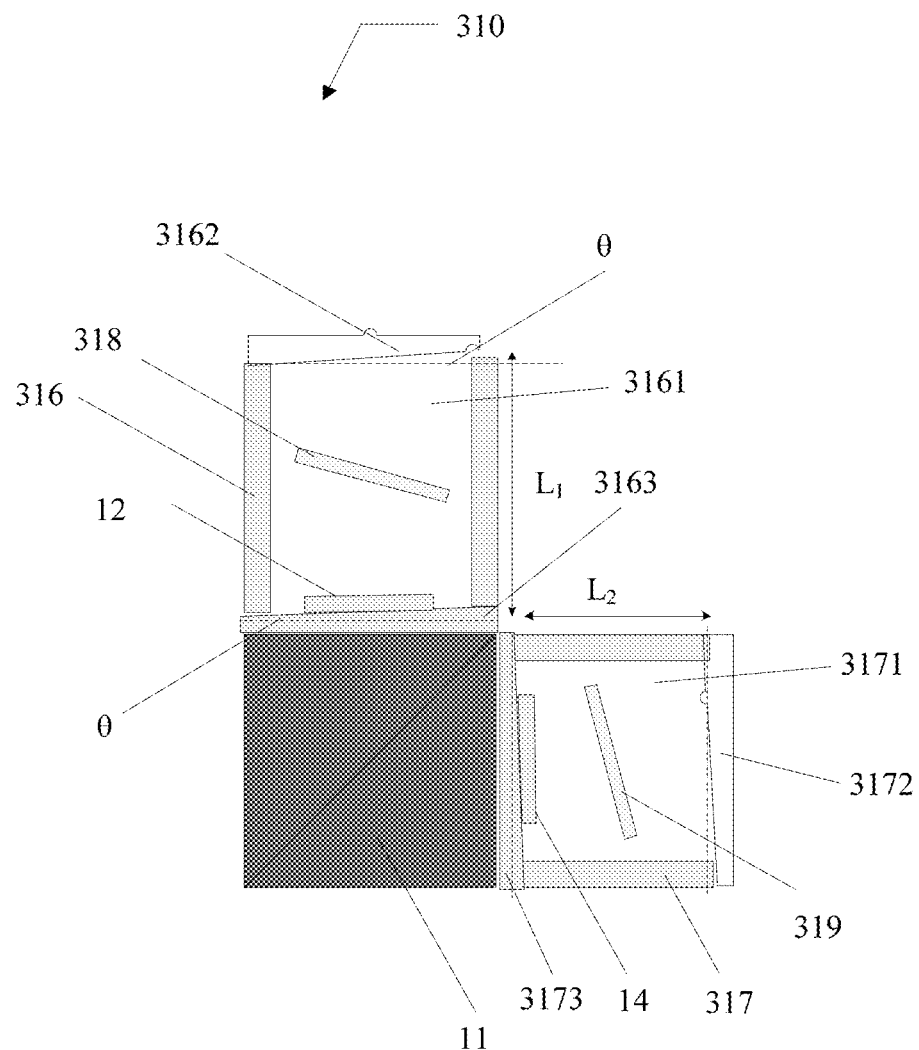
FIG. 7 is another schematic structural diagram of the first phase retarder shown in FIG. 5.

Referring to FIG. 7, FIG. 7 is another schematic structural diagram of the first phase retarder shown in FIG. 5. In this embodiment of the present invention, an inner surface of the front wall 3163 of the first etalon 316 and an inner surface of the first reflective surface 3162 may be designed as inclined surfaces with a predetermined angle θ, and preferably, the two inclined surfaces are parallel to each other. An inner surface of the front wall 3173 of the second etalon 317 and an inner surface of the second reflective surface 3172 may also be set as inclined surfaces with a predetermined angle θ, thereby avoiding an undesired interference phenomenon on the inner surface of the front wall and the reflective surface, so as to improve optical performance of the optical comb filter 100.

Referring to FIG. 1, in this embodiment of the present invention, the optical comb filter 100 further includes a third light compensation element 34, and the third light compensation element 34 is disposed between the first half-wave plate 32 and the first phase retarder 10. The third light compensation element 34 may be a polarization mode dispersion (PMD) compensation plate, and is configured to compensate a difference between an optical path of the first sub-signal light 610 propagated in the first birefringent crystal 31 and an optical path of the second sub-signal light 620 propagated in the first birefringent crystal 31. The first sub-signal light 610 and the second sub-signal light 620 go through different optical paths in the first birefringent crystal 31, and the second sub-signal light 620 goes through a relatively longer optical path. Therefore, the third light compensation element 34 is disposed to compensate the optical path of the first sub-signal light 610, so that before entering the first phase retarder 10, the first sub-signal light 610 and the second sub-signal light 620 have a same phase.

In this embodiment of the present invention, the optical comb filter 100 further includes a second phase retarder 40, and a structure design of the second phase retarder 40 is basically the same as a structure of the first phase retarder 10 provided in any of the foregoing first embodiment to third embodiment. Using the first embodiment as an example, the second phase retarder 40 has a second polarization beam splitter 41, a third air arm, and a fourth air arm, where the third air arm has a third optical path $L_3$, the fourth air arm has a fourth optical path $L_4$, and a value of $(L_4-L_3)$ is twice that of $(L_2-L_1)$. The first interference light 611 is incident on a fifth side wall of the second polarization beam splitter 41 and is decomposed by the second polarization beam splitter 41 into a fifth sub-light component propagated in a first direction and a sixth sub-light component propagated in a second direction. The second interference light 621 is incident on the fifth side wall of the second polarization beam splitter 41 and is decomposed by the second polarization beam splitter 41 into a seventh sub-light component propagated in the first direction and an eighth sub-light component propagated in the second direction. The third air arm receives the fifth sub-light component and the seventh sub-light component, and reflects the fifth sub-light component and the seventh sub-light component back to the second polarization beam splitter 41 by using the third reflector 43. Because in the third air arm, the fifth sub-light component and the seventh sub-light component go through the third polarizer 42 back and forth twice, polarization directions of the fifth sub-light component and the seventh sub-light component are rotated by 90°. Similarly, the fourth air arm receives the sixth sub-light component and the eighth sub-light component, and reflects the sixth sub-light component and the eighth sub-light component back to the second polarization beam splitter 41 by using the fourth reflector 45. Because in the fourth air arm, the sixth sub-light component and the eighth sub-light component go through the fourth polarizer 44 back and forth twice, polarization directions of the sixth sub-light component and the eighth sub-light component are rotated by 90°. Then in the second polarization beam splitter 41, the fifth sub-light component and the sixth sub-light component interfere with each other and generate third interference light 612, and the seventh sub-light component and the eighth sub-light component interfere with each other and generate fourth interference light 622.

It should be noted that in this embodiment of the present invention, the structure of the second phase retarder 40 may also be the structure of the first phase retarder 10 of the foregoing second embodiment and third embodiment, and details are not described herein again.

It should be noted that in this embodiment of the present invention, the second phase retarder 40 is configured to correct shapes of spectral lines of the first interference light 611 and the second interference light 621 that are output by the first phase retarder 10, to make the shapes of the spectral lines more rectangular and planar. It can be understood that in other embodiments of the present invention, the optical comb filter 100 may further be cascaded with more phase retarders, such as a third phase retarder and a fourth phase retarder. Theoretically, more overlapped harmonic items (that is, more cascaded phase retarders) indicate that the shape of the spectral line is closer to a rectangular wave, that is, a spectrum with a better waveform may be obtained.

It should be noted that in this embodiment of the present invention, a third half-wave plate 46 is further disposed between the first phase retarder 10 and the second phase retarder 40. The third half-wave plate 46 may be a 28.5° half-wave plate, and is configured to adjust a transmission spectrum shape, an isolation degree, and the like. It can be understood that in other embodiments of the present invention, according to actual requirements, the third half-wave plate 46 may also be a half-wave plate with another degree, that is, an included angle between a vibration plane of an incident light and a crystal principal cross-section of the third half-wave plate 46 may be designed according to actual requirements, and is not specifically limited in the present invention.

It should be noted that in this embodiment of the present invention, a fourth half-wave plate 51 is further disposed between the second phase retarder 40 and the second optical splitting component. The fourth half-wave plate 51 may be an 8° half-wave plate, and is configured to adjust a transmission spectrum shape, an isolation degree, and the like. It can be understood that in other embodiments of the present invention, according to actual requirements, the fourth half-wave plate 51 may be a half-wave plate with another degree, and this is not specifically limited in the present invention.

Figure 8:
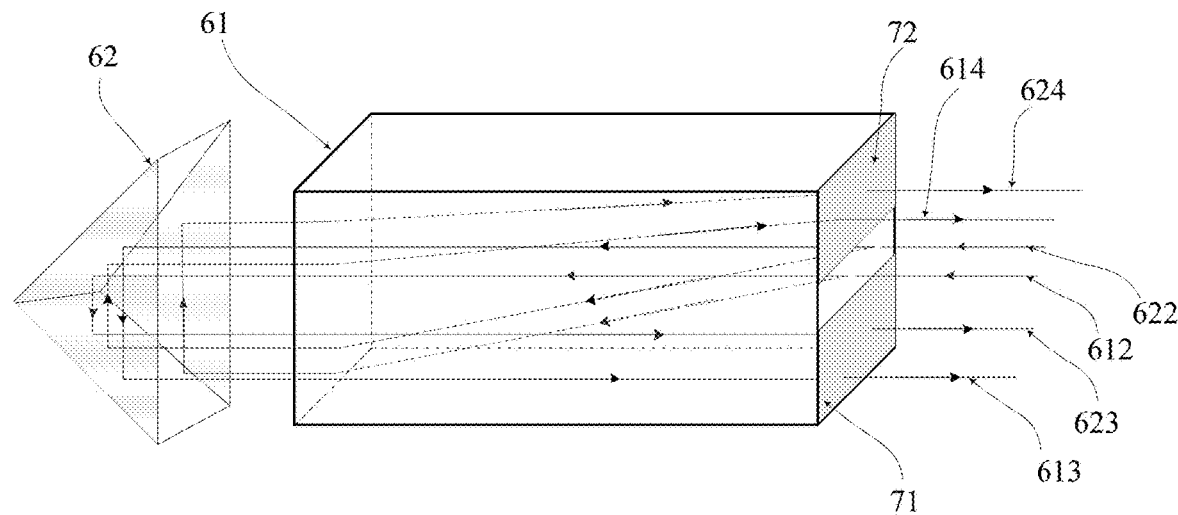
FIG. 8 is a schematic diagram of optical paths of beams at a second birefringent crystal and a rear reflecting prism.

Referring to FIG. 8, FIG. 8 is a schematic diagram of optical paths of beams at a second birefringent crystal and a rear reflecting prism. In this embodiment of the present invention, the second optical splitting component includes a second birefringent crystal 61 and a rear reflecting prism 62. The third interference light 612 and the fourth interference light 622 enter the second birefringent crystal 61 after being transmitted through the fourth half-wave plate 51. The second birefringent crystal 61 decomposes the third interference light 612 into o light 613 and e light 614, and also decomposes the fourth interference light 622 into o light 623 and e light 624. The two beams of o light and two beams of e light are propagated to the rear reflecting prism 62, and are output to the second phase retarder 40 after being reflected back to the second birefringent crystal 61 by the rear reflecting prism 62.

It should be noted that in this embodiment of the present invention, the optical comb filter 100 further includes a fifth half-wave plate 71 and a sixth half-wave plate 72, and the fifth half-wave plate 71 and the sixth half-wave plate 72 are disposed between the second birefringent crystal 61 and the fourth half-wave plate 51. The fifth half-wave plate 71 is configured to receive the o light 613 and the o light 623 that are reflected by the second optical splitting component, so as to enable polarization directions of the o light 613 and the o light 623 to rotate by a predetermined angle. The sixth half-wave plate 72 is configured to receive the e light 614 and the e light 624 that are reflected by the second optical splitting component, so as to enable polarization directions of the e light 614 and the e light 624 to rotate by the predetermined angle, for example, preferably, the fifth half-wave plate 52 and the sixth half-wave plate 53 may be 45° half-wave plates, and the predetermined angle is 90°. The fifth half-wave plate 71 and the sixth half-wave plate 72 adjust the polarization directions of the o light 613, the e light 614, the o light 623, and the e light 624, so as to adjust the shape of the transmission spectrum.

In this embodiment of the present invention, the o light 613, the e light 614, the o light 623, and the e light 624 are transmitted through the fourth half-wave plate 51 again after passing through the fifth half-wave plate 71 and the sixth half-wave plate 72, and become a beam 615, a beam 616, a beam 625, and a beam 626 after passing through the second phase retarder 40 and the third half-wave plate 46. After the beam 615, the beam 616, the beam 625, and the beam 626 enter the first phase retarder 10 and are transmitted through the first phase retarder 10, the beam 615 and the beam 626 are emergent from a position close to the bottom of the first polarization beam splitter 11, and the beam 616 and the beam 626 are emergent from a position close to the top of the first polarization beam splitter 11.

It should be noted that in this embodiment of the present invention, the optical comb filter 100 further includes a seventh half-wave plate 81 and an eighth half-wave plate 82, where the seventh half-wave plate 81 and the eighth half-wave plate 82 are disposed between the third light compensation plate 34 and the first phase retarder 10, and the seventh half-wave plate 81 and the eighth half-wave plate 82 may be 0° half-wave plates. When being emergent from the first phase retarder 10, the beam 615 and the beam 625 are propagated to the first birefringent crystal 31 after being transmitted through the seventh half-wave plate 81, the third light compensation plate 34, and the first half-wave plate 32. After being emergent from the first phase retarder 10, the beam 616 and the beam 626 are propagated to the first birefringent crystal 10 after being transmitted through the eighth half-wave plate 82, the third light compensation plate 34, and the second half-wave plate 33.

In this embodiment of the present invention, the beam 615, the beam 616, the beam 625, and the beam 626 enter the first birefringent crystal 10. In the first birefringent crystal 10, for the beam 615 and the beam 625, because of characteristics of a birefringent crystal, the beam 615 and the beam 625 are combined and finally form first output light 617. For the beam 616 and the beam 626, because of characteristics of a birefringent crystal, the beam 615 and the beam 625 are combined and finally form second output light 627. The first output light 617 and the second output light 627 are two columns of signal light with a predetermined frequency interval.

It should be noted that in this embodiment of the present invention, the input collimator 21 is disposed between the first output collimator 22 and the second output collimator 23. The first output collimator 22 is configured to receive the first output light 617 output by the first birefringent crystal 31, and the second output collimator 23 is configured to receive the second output light 627 output by the first birefringent crystal 31. It should be noted that a working distance of the collimator should be equal to or slightly longer than an optical path that light goes through in the optical comb filter 100.

It should be noted that in this embodiment of the present invention, the optical comb filter 100 further includes a first rhombic prism 91 and a second rhombic prism 92. The first rhombic prism 91 is aligned with the first output collimator 22 and is configured to propagate, to the first output collimator 22, the first output light 617 output by the first birefringent crystal 31. The second rhombic prism 92 is aligned with the second output collimator 23 and is configured to propagate, to the second output collimator 23, the second output light 627 output by the first birefringent crystal 31. The first rhombic prism 91 and the second rhombic prism 92 may be configured to increase a distance between the first output light 617 and the second output light 627 in space, to prevent that the first output collimator 22 and the second output collimator 23 are inconvenient to place because the first output light 617 and the second output light 627 are excessively close in space.

Figure 9:
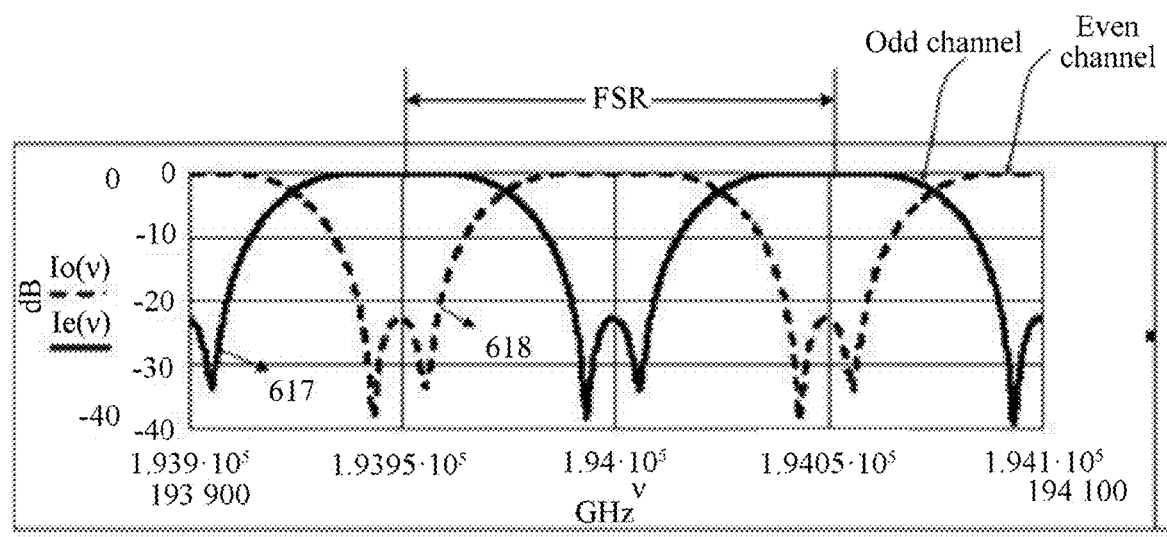
FIG. 9 is a schematic diagram of a transmission spectral line of an optical comb filter.

Referring to FIG. 9, FIG. 9 is a schematic diagram of a transmission spectrum of the foregoing optical comb filter 100. In the present invention, an FSR is implemented by precisely controlling the first optical path difference $\Delta L_1$ of the first phase retarder 10, and the shape of the transmission spectrum is corrected by precisely controlling the optical path difference of the second phase retarder 40, so that the shape to be more rectangular and planar.

As shown in Table 1, the optical comb filter 100 of this embodiment of the present invention may obtain a desired optical path difference $\Delta L_1$ by controlling optical paths of air arms, so as to implement different FSRs and different channel intervals.

TABLE 1

Comparison table of optical path differences corresponding to different channel intervals

| Name | FSR (GHz) | $L_2$-$L_1$ (mm) | $L_4$-$L_3$ (mm) |
|---|---|---|---|
| 100 GHz | 200 | 0.75 | 1.5 |
| 50 GHz | 100 | 1.5 | 3 |
| 25 GHz | 50 | 3 | 6 |

As shown in Table 1, channels with intervals of 100 GHz to 50 GHz to 25 GHz or even denser channels may be implemented by changing values of ($L_2$-$L_1$) and ($L_4$-$L_3$). It can be understood that with development of an optical network, in order to enhance network flexibility and improve frequency spectrum utilization efficiency, people pay more attention to flexible network architectures. Some optical comb filters with special channel intervals may be favored by people, for example, an optical comb filter with a channel interval of 75 GHz. In this case, the optical comb filter with a channel interval of 75 GHz may be implemented by only adjusting ($L_2$-$L_1$) to be equal to 2 mm and ($L_4$-$L_3$) to be equal to 4 mm.

Figure 10:
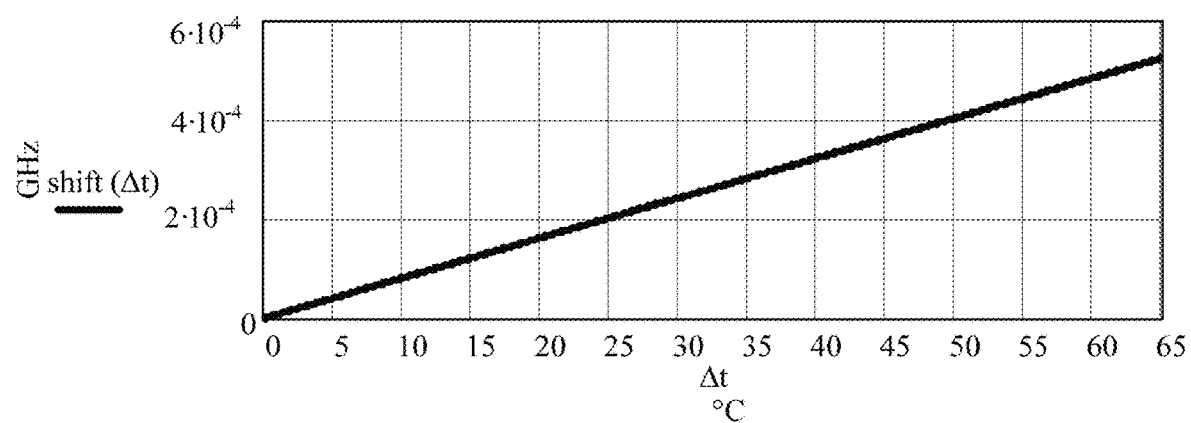
FIG. 10 is a schematic diagram of a temperature drift effect of an optical comb filter.

Referring to FIG. 10, in this embodiment of the present invention, an FSR of an optical comb filter is controlled by adjusting optical paths of air arms. Because air is a good thermal insulator and an air refractive index changes slightly with the temperature, an effect caused by the temperature is extremely small and may be neglected. Certainly, because of errors in manufacturing a polarized beam splitter (PBS), etalons, and the like, glass errors of two arms of the PBS also contribute to an optical path difference. As shown in Table 2, Table 2 shows thermo-optic coefficients and coefficients of thermal expansion of air and fused quartz. It can be seen from FIG. 10 that for a working temperature in a range of 0° to 65°, because a drift change trend caused by a temperature change is only $5.2 \times 10^{-4}$ GHz and such a tiny drift can be neglected, it indicates that the optical comb filter in this embodiment of the present invention has a good temperature drift effect.

TABLE 2

Table of parameters of air and fused quartz

| 1550 nm | Refractive index n | Thermo-optic coefficient $\frac{dn}{dt}$ | Coefficients of expansion $\alpha$ |
|---|---|---|---|
| Air | 1.00027 | 0 | 0 |
| Fused quartz | 1.4596 | $9.6 \times 10^{-6}$ | $0.55 \times 10^{-6}$ |

Figure 11A:
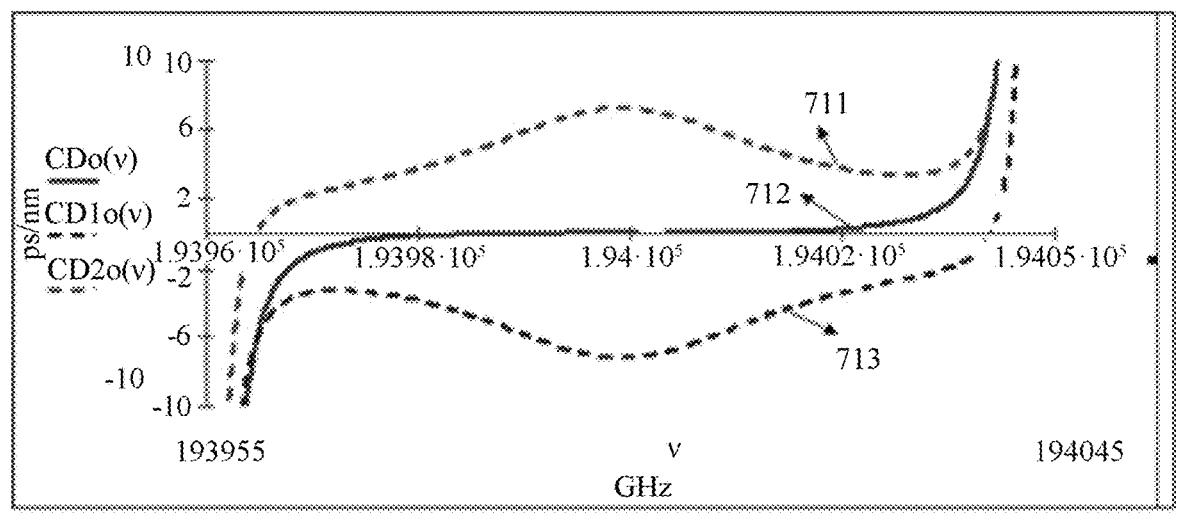
FIG. 11(a) is a dispersion curve chart of an odd channel.
Figure 11B:
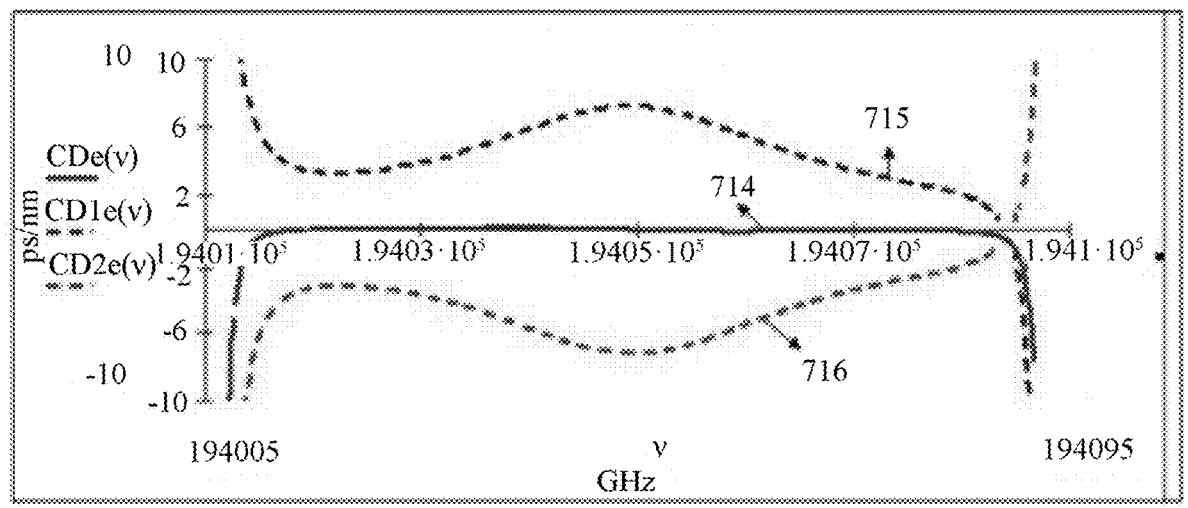
FIG. 11(b) is a dispersion curve chart of an even channel.

In addition, when a transmission rate of a high-speed dense wavelength division multiplexing system is more than 40 Gbit/s, a dispersion problem in a communications system becomes very important. Generally, an accumulated dispersion of a 40 Gbit/s system is less than 50 ps/nm and an accumulated dispersion of a 160 Gbit/s system is less than 5 ps/nm. Therefore, a numerical value of a dispersion capacity of the system is reduced, and a tiny fluctuation in total dispersion of the system may cause degradation of transmission quality. FIG. 11(a) and FIG. 11(b) are dispersion curves of an odd channel and an even channel of an optical comb filter when a channel interval is 50 GHz. A curve 713 and a curve 715 are respectively a dispersion curve of a single outbound path of the odd channel and a dispersion curve of a single outbound path of the even channel, a curve 711 and a curve 714 are respectively a dispersion curve of a single inbound path of the odd channel and a dispersion curve of a single inbound path of the even channel, and a curve 712 and a curve 716 are total exiting dispersion curves of the odd channel and the even channel respectively. It may be seen from FIG. 11(a) and FIG. 11(b) that in a range of ITU±25 Hz, dispersion values of the odd channel and the even channel are basically 0, demonstrating superior dispersion characteristics. A cause to this phenomenon is that for the outbound-path dispersion curve 711 and the inbound-path dispersion curve 713, or for the curve 715 and the curve 716, in the range of ITU±25 Hz, dispersion values demonstrate a good complementary destructive phenomenon. That is, after signal light goes back and forth in a device, dispersions are canceled in a filtering channel range.

In conclusion, in an optical comb filter 100 of embodiments of the present invention, the first phase retarder 10 with an adjustable optical path difference and the second phase retarder 40 with an adjustable optical path difference are designed, so as to implement adjustability of a channel interval, overcome a defect that it is hard to upgrade an optical comb filter of a birefringent crystal type, and implement comb filtering of channels at intervals of 100 GHz to 50 GHz to 25 GHz or of denser channels. In addition, because both the first phase retarder 10 and the second phase retarder 40 use structural designs of air arms (air cavities), the phase retarders have an extremely small temperature drift effect, low insertion loss, high isolation degrees, and have extremely low dispersions in a filtering channel range of a transmission spectrum, meeting a transmission application scenario of a dense wavelength division multiplexing system with a higher rate.

The foregoing descriptions are exemplary implementation manners of the present invention. It should be noted that a person of ordinary skill in the art may make certain improvements and polishing without departing from the principle of the present invention and the improvements and polishing shall fall within the protection scope of the present invention. Additionally, statements made herein characterizing the invention refer to an embodiment of the invention and not necessarily all embodiments.

What is claimed is:

1. A phase retarder, comprising:
   a polarization beam splitter;
   a first air arm; and
   a second air arm;
   wherein the polarization beam splitter is configured to decompose a beam incident on a first side wall of the polarization beam splitter into a first light component propagated in a first direction and a second light component propagated in a second direction, wherein the first direction is perpendicular to the second direction, and a polarization state of the first light component is perpendicular to a polarization state of the second light component;
   wherein the first air arm is disposed on a second side wall of the polarization beam splitter, and is configured to receive the first light component and reflect the first light component back to the polarization beam splitter;
   wherein the second air arm is disposed on a third side wall of the polarization beam splitter, and is configured to receive the second light component and reflect the second light component back to the polarization beam splitter, so that interference light is formed after the second light component interferes with the first light component, and the interference light is emitted from a fourth side wall of the polarization beam splitter; and
   wherein a first optical path of the first air arm is not equal to a second optical path of the second air arm, the first side wall and the third side wall are disposed opposite to each other, and the second side wall and the fourth side wall are disposed opposite to each other;
   wherein the first air arm comprises a first etalon and a first polarizer, the first etalon has a first air cavity and a first reflective surface, and the first polarizer is disposed in the first air cavity;
   wherein the first polarizer is configured to change the polarization state of the first light component emitted from the second side wall, wherein the first light component is propagated to the first reflective surface after being transmitted through the first polarizer;
   wherein the first reflective surface is configured to reflect the received first light component to the first polarizer, so that the first polarizer changes the polarization state of the first light component again and then propagates the first light component to the polarization beam splitter, to enable the first light component to be propagated in the first direction;

wherein the second air arm comprises a second etalon and a second polarizer, the second etalon has a second air cavity and a second reflective surface, and the second polarizer is disposed in the second air cavity;

wherein the second polarizer is configured to change the polarization state of the second light component emitted from the third side wall, wherein the second light component is propagated to the second reflective surface after being transmitted through the second polarizer;

wherein the second reflective surface is configured to reflect the received second light component to the second polarizer, so that the second polarizer changes the polarization state of the second light component again and then propagates the second light component to the polarization beam splitter, to enable the second light component to be propagated in the first direction;

wherein an inner surface of the first reflective surface of the first etalon and an inner surface of a front wall that is provided on the second side wall are inclined surfaces with predetermined angles and are parallel to one another, and an inner surface of the second reflective surface of the second etalon and an inner surface of a front wall that is provided on the third side wall are inclined surfaces with predetermined angles and are parallel to one another.

2. The phase retarder according to claim 1, wherein the first air arm further comprises a first light compensation plate, and the first light compensation plate is disposed in the first air cavity of the first etalon and is located between the first polarizer and the first reflective surface, so as to adjust the first optical path by rotation; and wherein the second air arm further comprises a second light compensation plate, and the second light compensation plate is disposed in the second air cavity of the second etalon and is located between the second polarizer and the second reflective surface, so as to adjust the second optical path by rotation.

3. An optical comb filter, comprising:
a first subsystem comprising: a first optical splitting component; and a first phase retarder system; and
a second subsystem comprising: a second phase retarder system; and a second optical splitting component;

wherein the first optical splitting component is configured to receive signal light and output a group of beams including a first beam and a second beam;

wherein the first phase retarder system is configured to receive the first beam and the second beam, and to output first interference light and second interference light, wherein the first phase retarder system comprises: a first polarization beam splitter, a first air arm, and a second air arm;

wherein the first polarization beam splitter is configured to decompose the first beam into a first sub-light component propagated through the first air am and a second sub-light component propagated through the second air arm, and to decompose the second beam into a third sub-light component propagated through the first air arm and a fourth sub-light component propagated through the second air arm, wherein the first interference light corresponds to interference between the first sub-light component and the second sub-light component, and wherein the second interference light corresponds to interference between the third sub-light component and the fourth sub-light component;

wherein the second phase retarder system is configured to receive the first interference light and the second interference light, and to output third interference light and fourth interference light, wherein the second phase retarder system comprises: a second polarization beam splitter, a third air arm, and a fourth air arm;

wherein the second polarization beam splitter is configured to decompose the first interference light into a fifth sub-light component propagated through the third air arm and a sixth sub-light component propagated through the fourth air arm, and to decompose the second interference light into a seventh sub-light component propagated through the third air arm and a eighth sub-light component propagated through the fourth air arm, wherein the third interference light corresponds to interference between the fifth sub-light component and the sixth sub-light component, and wherein the fourth interference light corresponds to interference between the seventh sub-light component and the eighth sub-light component; and wherein the second optical splitting component is configured to receive the third interference light and the fourth interference light, to decompose the third interference light into two light beams, to decompose the fourth interference light into two light beams, to output the two light beams corresponding to the third interference light and the two light beams corresponding to the fourth interference light back to the second phase retarder system.

4. The optical comb filter according to claim 3, wherein the optical comb filter further comprises:
an input collimator, configured to collimate the signal light;
wherein the signal light received by the first optical splitting component is the collimated signal light from the input collimator.

5. The optical comb filter according to claim 4, wherein the first optical splitting component comprises a first birefringent crystal, a first half-wave plate, and a second half-wave plate;
wherein the first birefringent crystal is configured to receive the signal light and decompose the signal light into the first beam and the second beam;
wherein the first half-wave plate is configured to receive the first beam and enable a polarization direction of the first beam to rotate by a predetermined angle;
wherein the second half-wave plate is configured to receive the second beam and enable a polarization direction of the second beam to rotate by a predetermined angle; and
wherein the first beam and the second beam that are output by the first half-wave plate and the second half-wave plate form the group of beams and are propagated to the first polarization beam splitter.

6. The optical comb filter according to claim 5, wherein the first air arm comprises a first polarizer and a first reflector, and the first polarizer is disposed between the first polarization beam splitter and the first reflector.

7. The optical comb filter according to claim 6, wherein the second air arm comprises a second polarizer and a second reflector, and the second polarizer is disposed between the first polarization beam splitter and the second reflector.

8. The optical comb filter according to claim 5, wherein the first air arm comprises a first etalon and a first polarizer, the first etalon has a first air cavity and a first reflective surface, and the first polarizer is disposed in the first air cavity.

9. The optical comb filter according to claim 8, wherein the second air arm comprises a second etalon and a second polarizer, the second etalon has a second air cavity and a second reflective surface, and the second polarizer is disposed in the second air cavity.

10. The optical comb filter according to claim 9, wherein the first air arm further comprises a first light compensation plate, and the first light compensation plate is disposed in the first air cavity and is located between the first polarizer and the first reflective surface, so as to adjust the first optical path by rotation; and wherein the second air arm further comprises a second light compensation plate, and the second light compensation plate is disposed in the second air cavity and is located between the second polarizer and the second reflective surface, so as to adjust the second optical path by rotation.

11. The optical comb filter according to claim 9, wherein an inner surface of the first reflective surface of the first etalon and an inner surface of a front wall that is provided on the second side wall are inclined surfaces with predetermined angles, and an inner surface of the second reflective surface of the second etalon and an inner surface of a front wall that is provided on the third side wall are inclined surfaces with predetermined angles.

* * * * *